(12) United States Patent
Correia et al.

(10) Patent No.: US 7,857,587 B2
(45) Date of Patent: Dec. 28, 2010

(54) TURBINE BLADES AND TURBINE BLADE COOLING SYSTEMS AND METHODS

(75) Inventors: Victor Hugo Silva Correia, Milton Mills, NH (US); Robert Francis Manning, Newburyport, MA (US); Bhanu Mahasamudram Reddy, Boxford, MA (US)

(73) Assignee: General Electric Company, Schenectady, NY (US)

( * ) Notice: Subject to any disclaimer, the term of this patent is extended or adjusted under 35 U.S.C. 154(b) by 635 days.

(21) Appl. No.: 11/606,731

(22) Filed: Nov. 30, 2006

(65) Prior Publication Data

US 2008/0131278 A1 Jun. 5, 2008

(51) Int. Cl.
F01D 5/18 (2006.01)
B64C 11/24 (2006.01)

(52) U.S. Cl. .................. 416/92; 416/97 R; 416/228; 416/235

(58) Field of Classification Search .............. 415/173.1, 415/173.6; 416/1, 92, 96 R, 97 R, 228, 235
See application file for complete search history.

(56) References Cited

U.S. PATENT DOCUMENTS

| | | | |
|---|---|---|---|
| 5,261,789 A | | 11/1993 | Butts et al. |
| 5,564,902 A * | | 10/1996 | Tomita ..................... 416/97 R |
| 5,733,102 A * | | 3/1998 | Lee et al. .................. 416/97 R |
| 6,164,914 A * | | 12/2000 | Correia et al. ............. 416/97 R |
| 6,224,336 B1 * | | 5/2001 | Kercher .................... 416/97 R |
| 6,231,307 B1 * | | 5/2001 | Correia ..................... 416/97 R |
| 6,527,514 B2 * | | 3/2003 | Roeloffs ................... 416/97 R |
| 6,634,860 B2 * | | 10/2003 | Lee et al. .................. 416/97 R |
| 6,652,235 B1 | | 11/2003 | Keith et al. |
| 6,672,829 B1 * | | 1/2004 | Cherry et al. ............... 415/115 |
| 6,790,005 B2 * | | 9/2004 | Lee et al. .................. 416/97 R |
| 6,824,359 B2 * | | 11/2004 | Chlus et al. .................. 416/92 |
| 6,837,687 B2 * | | 1/2005 | Lee et al. ..................... 416/224 |
| 6,971,851 B2 * | | 12/2005 | Liang ............................ 416/1 |
| 6,991,430 B2 * | | 1/2006 | Stec et al. ................. 416/97 R |
| 6,994,514 B2 * | | 2/2006 | Soechting et al. ........... 415/115 |

* cited by examiner

*Primary Examiner*—Edward Look
*Assistant Examiner*—Sean J Younger
(74) *Attorney, Agent, or Firm*—Marcella R. Louke; William Scott Andes; General Electric Company

(57) ABSTRACT

A turbine blade with improved tip cooling includes an airfoil having a tip cap and a tip wall extending outwardly from the tip cap. A recessed portion of the tip wall forms a tip shelf. At least one tip shelf hole extends through the tip shelf in flow communication with an internal airfoil cooling circuit. At least one tip wall opening extends through the recessed portion of the tip wall radially outward of the tip shelf in flow communication with the internal cooling circuit. The recessed tip wall portion may be tapered from a wider base to a minimum thickness. In a cooling method, cooling air channeled through the tip wall openings joins and mixes with a stream of hot combustion gases downstream of where cooling air channeled through the tip shelf openings joins and mixes with the stream of hot gasses to enhance convection cooling of the blade tip. A system for cooling a blade includes at least one tip shelf hole and at least one tip wall opening for channeling cooling air from an internal cooling circuit toward a stream of hot combustion gases for improved cooling of at least the blade tip.

16 Claims, 3 Drawing Sheets

TURBINE BLADES AND TURBINE BLADE COOLING SYSTEMS AND METHODS

BACKGROUND OF THE INVENTION

This invention relates generally to gas turbine engines, and more specifically to a gas turbine engine rotor blade having improved tip cooling.

In general, a gas turbine engine includes one or more turbine blade rows disposed downstream of a combustor for extracting energy from combustion gases. A stator shroud is disposed radially outwardly of the rotor blade tips. A relatively small clearance is provided between the blade tips and the stator shroud to reduce leakage of the combustion gases over the blade tips during operation. The clearance between the blade tips and the stator shroud must nevertheless be adequate to minimize the occurrence of blade tip rubs during operation. Each of the rotor blades includes conventionally known pressure and suction sides which are preferentially aerodynamically contoured for extracting energy from the combustion gases.

Conventionally, the blades, including the blade tips, are cooled by channeling a portion of the compressed air from the gas turbine compressor through hollow turbine blades. Compressed air diverted to cool the blades is then not available for combustion in the combustor, decreasing engine efficiency.

Prior art turbine blade tips are particularly susceptible to the damaging effects of the hot combustion gases such as blade tip distress by oxidation and thermal fatigue. Erosion of the blade tip adversely affects the aerodynamic performance efficiency of the blade. Also, increases in the tip clearance results in decreased efficiency.

Blade cooling configurations may include film-cooling apertures extending through the blade pressure and suction sidewalls for channeling the cooling air from inside the blade to the outer surfaces to provide conventional film cooling thereof.

A known blade design includes a tip shelf extending along a first side of an airfoil, see for example, U.S. Pat. No. 5,261,789. A plurality of generally radially extending cooling holes is disposed through the tip shelf in flow communication with an interior flow channel to channel cooling air toward the blade tip.

Although previously known designs provide improvements in tip cooling, turbine blade tips remain susceptible to cracking due to thermal distress.

Accordingly, it is desirable to have improvements in blade tip cooling to improve operational performance and increase service life by reducing thermal fatigue.

BRIEF DESCRIPTION OF THE INVENTION

The above-mentioned need or needs may be met by exemplary embodiments which provide a turbine blade having an airfoil having pressure and suction sides and leading and trailing edges. A tip cap extends between pressure and suction sides and between the leading and trailing edges of the airfoil to at least partially bound an internal cooling circuit. A tip wall extends generally radially outwardly from and continuously around the tip cap. The tip wall includes a recessed portion inboard from the pressure side forming a tip shelf between an outer wall and the recessed portion. The exemplary blade includes a plurality of tip shelf holes extending through the tip shelf in flow communication with an internal cooling circuit extending within the airfoil. At least one tip wall opening extends through the recessed portion radially outward of the tip shelf in flow communication with the internal cooling circuit.

In an exemplary embodiment, there is provided a method for cooling at least the tip region of an exemplary turbine blade. An exemplary method includes channeling cooling air from the internal cooling circuit through at least one tip shelf hole and channeling cooling air from the internal cooling circuit through at least one tip wall opening. The cooling air channeled through the tip wall opening joins and mixes with a stream of hot combustion gases downstream of where cooling air channeled through the at least one film cooling tip shelf hole joins and mixes with the stream of hot combustion gases.

In an exemplary embodiment, there is provided a system for cooling at least the tip of an exemplary turbine blade. The turbine blade includes a tip wall having a recessed portion inboard from the pressure side and forming a tip shelf between an outer wall and the recessed portion. An exemplary system includes an internal cooling circuit extending within an airfoil, at least one tip shelf hole extending through the tip shelf in flow communication with the internal cooling circuit, and at least one tip wall opening extending through the recessed tip wall portion in flow communication with the internal cooling circuit.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
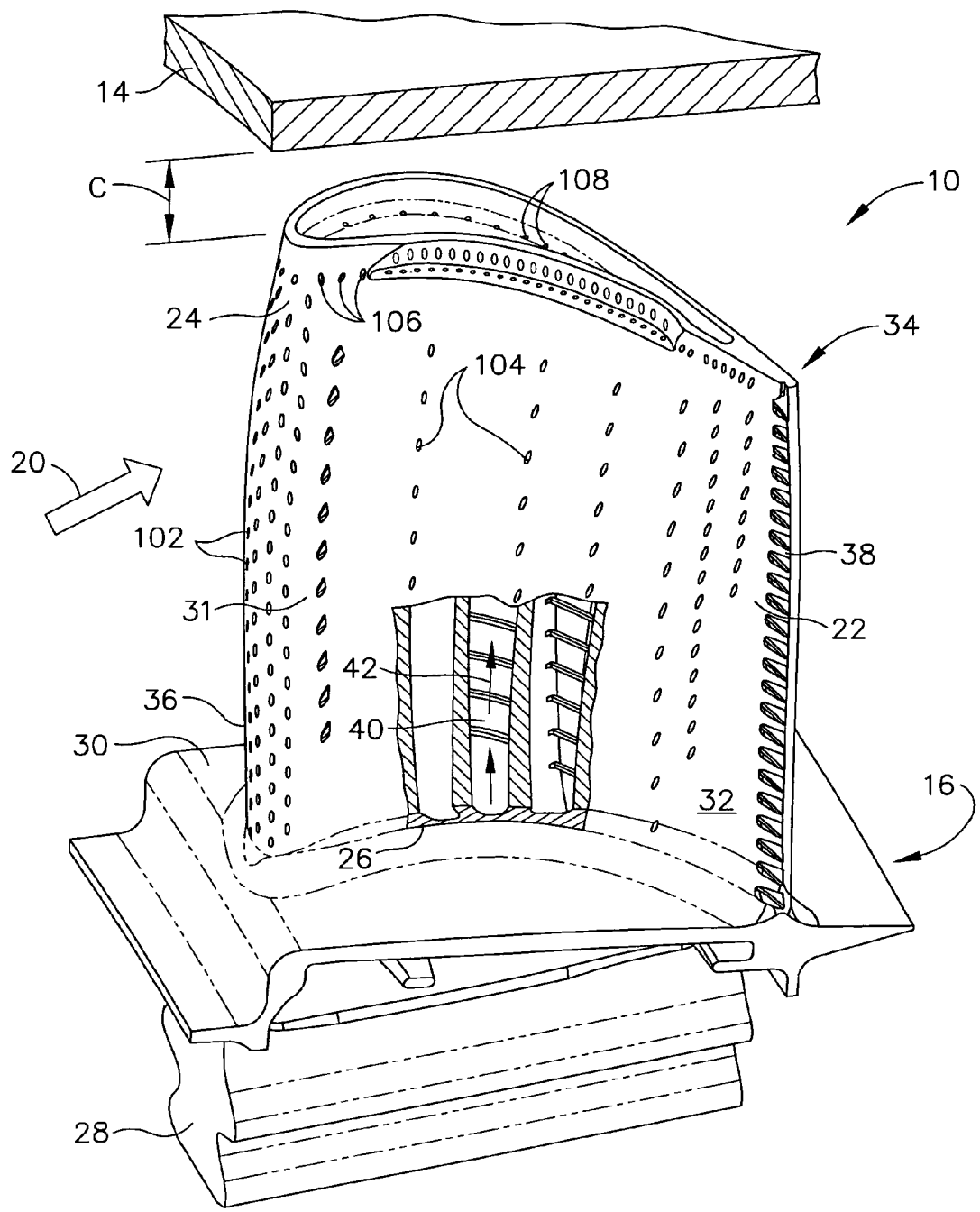
FIG. 1 is an isometric view illustration, partially cut away, of a gas turbine rotor blade stage showing an exemplary turbine blade.

Referring to the drawings wherein identical reference numerals denote the same elements throughout the various views, FIG. 1 shows a schematic representation of an exemplary high pressure turbine rotor blade stage 10 of a gas turbine engine used for powering an aircraft, for example. The turbine stage 10 includes a conventional annular stator shroud 14. A plurality of turbine rotor blades 16 in accordance with an exemplary embodiment is conventionally joined to a rotor disk (not shown). The turbine stage 10 is disposed downstream of a conventional combustor (not shown) which generates combustion gases 20 which flow between the turbine blades 16 from which energy is extracted by the blades 16 for rotating the rotor disk as is conventionally known.

Each of the turbine blades 16 includes a generally hollow airfoil 22 having a radially outer tip 24 disposed adjacent to the stator shroud 14 to define therebetween a tip clearance C which is conventionally small for reducing leakage of the combustion gases 20 over the airfoil tip 24. The airfoil 22 also includes a root 26 from which extends a conventional axial-entry dovetail 28 which is positioned in a complementary dovetail groove in the perimeter of the rotor disk for mounting the blade 16 thereto. The blade 16 also includes a conventional platform 30 formed integrally therewith at the juncture between the airfoil 22 and the dovetail 28 to provide a radially inner flow path boundary for the combustion gases 20 that flow between adjacent airfoils.

The airfoil 22 includes a continuous outer wall 31 with laterally opposed first and second sides 32, 34. First side 32, which is generally outwardly concave, is conventionally known as a pressure side. Second side 34, which is generally outwardly convex, is conventionally known as a suction side. The first and second sides 32, 34 are joined together at axially spaced apart, radially extending leading and trailing edges 36, 38, respectively. The first and second sides 32, 34 extend from the airfoil root 26 to the tip 24 and between the leading and trailing edges 36, 38 and are laterally spaced apart to define an internal cooling circuit 40 therein for channeling cooling air 42 through the airfoil 22 for the cooling thereof. The internal cooling circuit may comprise any of a variety of configurations chosen with sound engineering principles. The cooling air 42 is provided from a compressor (not shown) of the gas turbine engine and is conventionally channeled through the rotor disk and through the dovetail 28 into the airfoil 22.

Figure 2:
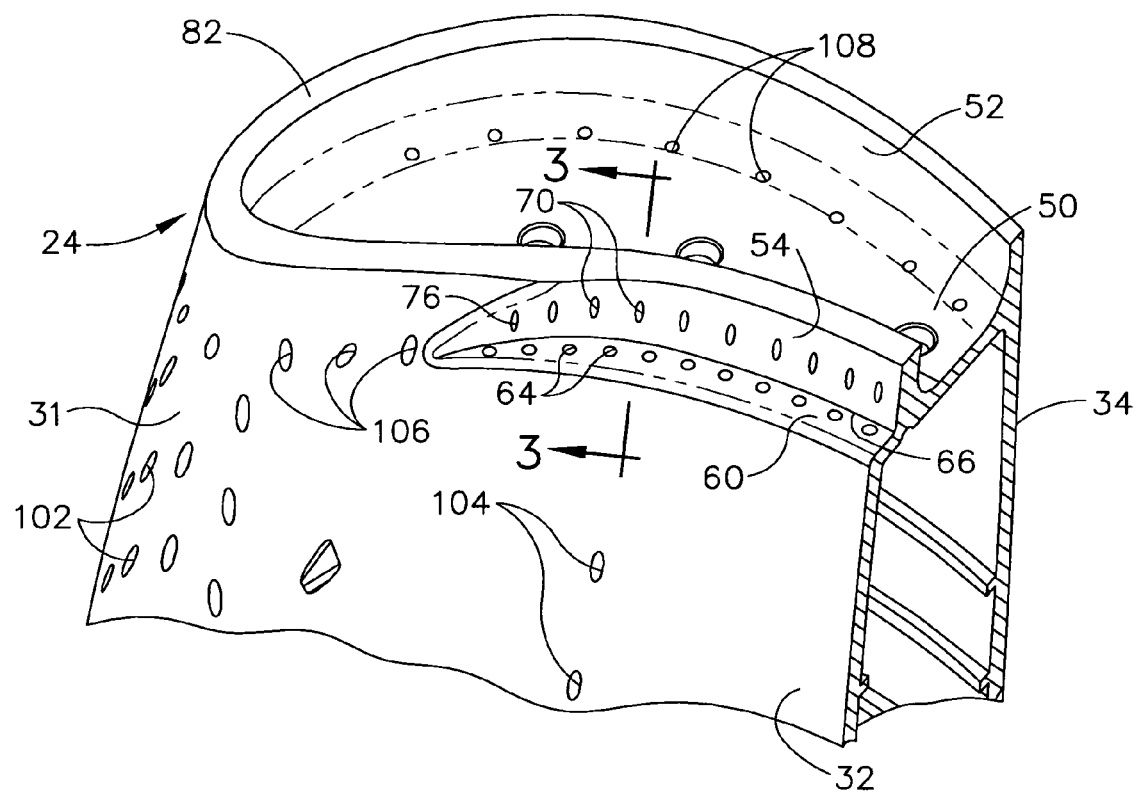
FIG. 2 is an enlarged cut away isometric view illustration of a portion of the turbine blade shown in FIG. 1, showing a tip wall and a tip shelf and exemplary film cooling tip wall openings and tip shelf holes.
Figure 3:
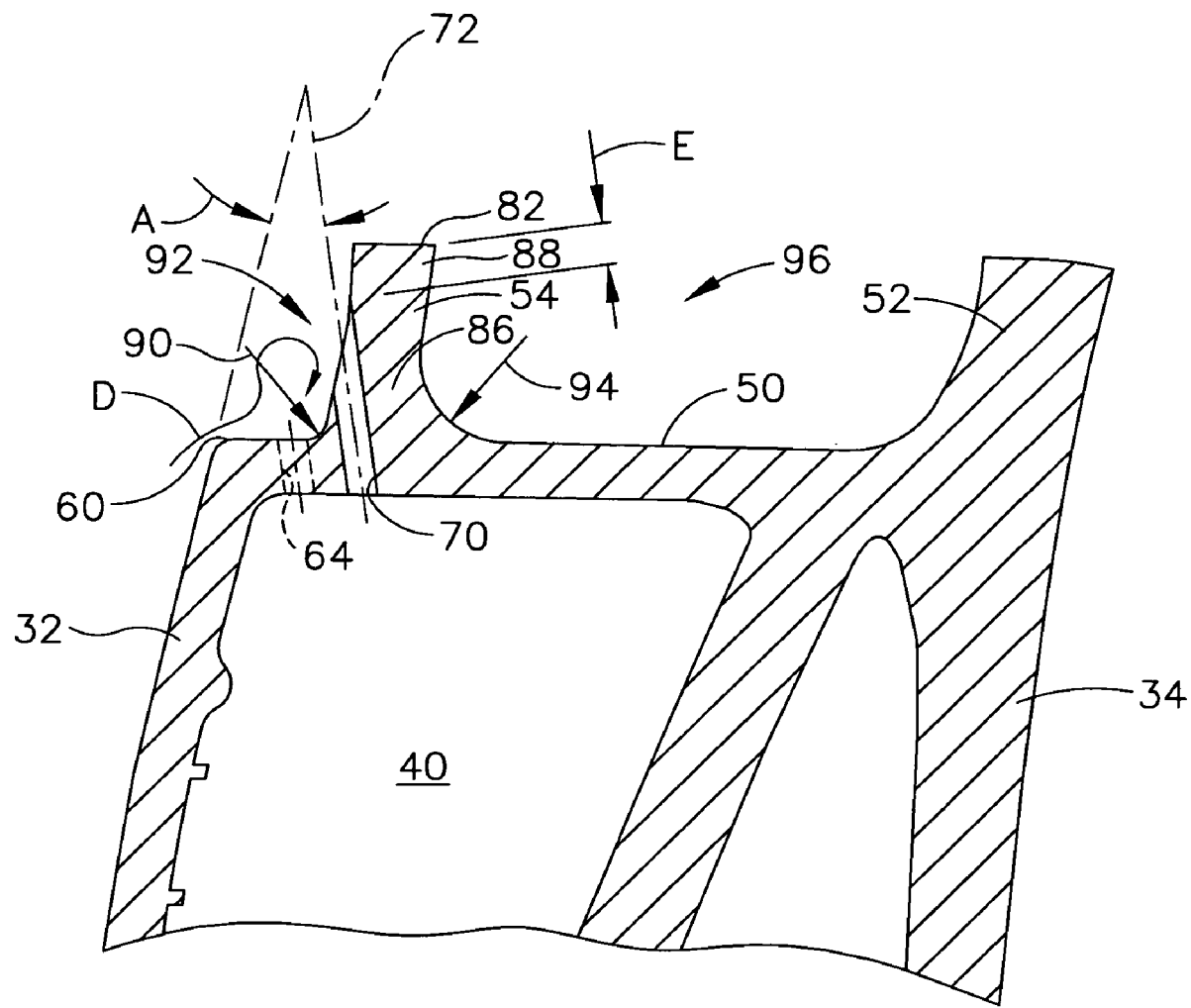
FIG. 3 is a cross-sectional view illustration taken through the line 3-3 in FIG. 2.

As shown in more particularity in FIGS. 2 and 3, the airfoil 22 includes an improved tip 24 in accordance with a preferred embodiment. More specifically, the tip 24 includes a tip cap 50 which extends between the airfoil first and second sides 32, 34 and between the leading and trailing edges 36, 38 for providing an upper boundary to the interior cooling circuit 40.

Tip 24 further includes a continuous tip wall 52 extending radially outwardly from and entirely around the tip cap 50 along the first and second sides 32, 34. The tip wall 52 and the tip cap 50 may be integrally formed or cast with the airfoil or be brazed or welded or otherwise attached in supporting connection thereto.

Further, with particular reference to FIGS. 2 and 3, a recessed tip wall portion 54 is recessed inboard from the first (pressure) side 32 of the outer wall 31 forming a tip shelf 60 between the recess tip wall portion 54 and the first side 32 of the outer wall 31. In an exemplary embodiment, a plurality of film cooling tip shelf holes 64 extend through the tip shelf 60 in flow communication with the internal cooling circuit 40. In an exemplary embodiment, the tip shelf holes 64 are spaced away from a junction 66 between the recessed tip wall portion 54 and the tip shelf 60. In an exemplary embodiment, the blade 16 includes between 18 and 23 tip shelf holes 64. In an exemplary embodiment, each tip shelf hole 64 has a diameter in a range of about 14-18 mils (0.36-0.46 mm). The shelf holes may be any present in any suitable number depending on the particular application.

In an exemplary embodiment, the recessed tip wall portion 54 includes a plurality of tip wall openings 70 extending therethrough in flow communication with the internal cooling circuit 40. In an exemplary embodiment, the tip wall openings 70 are disposed in staggered relationship with the tip shelf holes 64, as best seen in FIG. 2. In this disclosure, "staggered" means that the tip wall openings 70 may be axially offset from the tip shelf holes 64. In another exemplary embodiment, the tip wall openings 70 are disposed in aligned relationship with the tip shelf holes 64. In this disclosure "aligned" means that the tip wall openings 70 are substantially axially aligned. In yet another exemplary embodiment, the tip wall openings 70 are disposed in independent relationship with the tip shelf holes 64. In yet another embodiment, the tip wall openings 70 and the tip shelf holes 64 are disposed in a predetermined relative relationship in order to accomplish a desired cooling effect.

In an exemplary embodiment, the number of tip wall openings 70 may be similar to the number of tip shelf holes 64. In another embodiment, there may be more tip wall openings 70 than tip shelf holes 64. In yet another exemplary embodiment, there may be less tip wall openings 70 than tip shelf holes 64, depending on the particular application and the desired cooling effect. An exemplary turbine blade may include 18 tip shelf holes, and 17 tip wall openings, arranged in staggered relationship.

As illustrated in FIG. 3, each of the tip wall openings 70 is associated with a centerline 72. In an exemplary embodiment, each centerline 72 is oriented at an angle relative to the generally radially extending line at an acute angle A. In an exemplary embodiment, angle A is between about 15 to about 30 degrees. In an exemplary embodiment, each centerline 72 is inclined at generally the same angle A. In other exemplary embodiments, each centerline may be inclined generally the same as, or different from, any other centerline depending on the particular application.

In an exemplary embodiment, the tip wall openings are disposed so that the outlets 76 of the tip wall openings 70 generally are arranged in a single row as illustrated. In other exemplary embodiments, the outlets 76 may be disposed in more than one row.

In an exemplary embodiment, outlets 76 may be generally elliptical having radially extending major axes. As shown in FIG. 3, the size and positioning of the tip wall openings 70 encourage the formation of eddy currents, represented by arrow D, along the outboard side 92 of the recessed portion 54 to improve cooling thereof.

In an exemplary embodiment, the tip wall 52 includes a substantially planar top 82. During operation, the top 82 may rub against the stator shroud 14. In an exemplary embodiment, the tip wall openings 70 are radially disposed from the top 82 about 20-30 mils (0.51-0.76 mm). In an exemplary embodiment, because the tip wall openings 70 extend through the recess tip wall portion 54, and not through the top 82 of the tip wall, the openings 70 are not plugged due to blade tip rubs with the stator shroud 14.

As illustrated in the cross-sectional view of FIG. 3, in an exemplary embodiment, the tip wall 52, at least in the recessed tip wall portion 54, tapers along its length from a maximum wall thickness at the base 86 to a minimum wall thickness radially disposed from the base 86. In an exemplary embodiment, the minimum wall thickness is at the radially outermost region 88 of the recessed tip wall portion 54. In another exemplary embodiment, the minimum wall thickness is radially disposed from the radially outermost region 88. The degree of taper may be at least in part a function of a first radius 90 on the outboard side 92 of the recessed tip wall portion 54, and a second radius 94 on the inboard side 96 of the recessed tip wall portion 54. The tapering of at least the recessed tip wall portion 54 enhances the structural integrity in the area around the tip wall openings 70. Further, the tapering provides enhanced tip cooling by affecting the flow of hot gasses in the tip region and improved conduction from the cooler base to the hotter tip.

An exemplary method for cooling the blade tip 24 includes receiving cooling air 42 from the compressor into the cooling circuit 40. The cooling air 42 is channeled from the internal cooling circuit through at least one tip shelf hole 64. In an exemplary embodiment, the tip shelf 60 includes a plurality of tip shelf holes 64 through which cooling air is channeled. Cooling air from the internal cooling circuit 40 is also channeled through at least one tip wall opening 70 extending through the recessed tip wall portion 54. In an exemplary embodiment, the recessed portion of the tip wall includes a plurality of tip wall openings 70 through which cooling air is channeled.

In an exemplary embodiment, at least one tip shelf hole 64 and at least one tip wall opening 70 are disposed so that the cooling air channeled through the tip wall opening joins and mixes with a stream of hot combustion gases downstream from where cooling air channeled through the at least one tip shelf hole joins and mixes with the stream of hot combustion gases.

In an exemplary embodiment, there is provided a system for cooling a turbine blade 16. An exemplary system includes the internal cooling circuit 40 within the airfoil 22 which receives cooling air 42 from the compressor (not shown). An exemplary system also includes at least one tip shelf hole 64 extending through the tip shelf 60 for channeling cooling air toward a stream of combustion gases from the combustor (not shown). An exemplary system also includes at least one tip wall opening 70 for channeling cooling air toward the stream of combustion gases downstream of where the cooling air channeled through the at least one tip shelf hole joins and mixes with the combustion gases.

Each tip shelf hole 64 extends through a tip shelf 60 formed between a recessed tip wall portion 54 and the pressure side 32 of an outer wall 31 of the airfoil 22. Each tip wall opening 70 extends through the recessed tip wall portion 54 radially spaced from the tip shelf 60.

In the exemplary cooling system, the tip shelf holes 64 and the tip wall openings 70 cooperate with various other cooling holes to improve the service life of the blade 16. With reference to FIGS. 1-2, in an exemplary embodiment, the outer wall 31 is film cooled by flowing cooling air through leading edge shower head cooling holes 102 and cooling holes 104 along the outer wall 31. One or more cooling holes 106 may be disposed through the first (pressure) side 32 proximate the tip shelf 60. In an exemplary embodiment, a plurality of spaced tip cap supply holes 108 extend generally radially through the tip cap 50 in flow communication with the cooling circuit 40 for cooling the tip 24 and an inboard side 96 of the tip wall 52.

Thus, the turbine blades, cooling systems and methods disclosed herein provide improved performance by reducing blade tip distress and providing other desired effects.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine blade comprising:
    an airfoil including an outer wall extending radially outwardly from a root, the outer wall including pressure and suction sides extending laterally from a leading edge to a trailing edge of the airfoil,
    a tip cap extending between the pressure and suction sides and between the leading and trailing edges,
    a tip wall extending outwardly from the tip cap, wherein the tip wall includes a recessed portion recessed inboard from the pressure side of the outer wall forming a tip shelf between the outer wall and the recessed portion,
    an internal cooling circuit extending within the airfoil and being bounded in part by the tip cap,
    at least one tip shelf hole extending through the tip shelf in flow communication with the internal cooling circuit, and
    at least one tip wall opening extending through the recessed portion radially outward of the tip shelf in flow communication with the internal cooling circuit.

2. The turbine blade according to claim 1 comprising a plurality of tip wall openings extending through the recessed tip wall portion radially outward of the tip shelf in flow communication with the internal cooling circuit.

3. The turbine blade according to claim 1 wherein the at least one tip wall opening is associated with a centerline, and wherein the centerline is oriented at an acute angle with respect to a generally radially extending line.

4. The turbine blade according to claim 1 wherein the recessed tip wall portion is tapered from a maximum wall thickness at a base thereof to a minimum thickness at a location radially disposed from the base.

5. The turbine blade according to claim 4 wherein the maximum wall thickness is defined at least in part by a first radius associated with an outboard side of the recessed tip wall portion and a second radius associated with an inboard side of the recessed tip wall portion.

6. The turbine blade according to claim 2 wherein the recessed tip wall portion is tapered from a maximum wall thickness at a base thereof to a minimum thickness radially disposed from the base.

7. The turbine blade according to claim 2 comprising a plurality of tip shelf holes extending through the tip shelf in flow communication with the internal cooling circuit, and wherein each of the plurality of tip wall openings is generally disposed in staggered relationship to each of the plurality of tip shelf holes.

8. The turbine blade according to claim 2 wherein the centerlines of each tip wall opening are spaced between about 0.36 and 0.46 mm.

9. A method comprising:
    a) channeling cooling air from an internal cooling circuit of an airfoil through at least one tip shelf hole extending through a tip shelf formed between a recessed tip wall portion of a tip wall recessed inboard from a pressure side of an airfoil outer wall and the airfoil outer wall; and
    b) channeling cooling air from the internal cooling circuit through at least one tip wall opening extending through the recessed tip wall portion;
    wherein the cooling air channeled through the at least one tip wall opening joins and mixes with a stream of hot combustion gases downstream of where cooling air channeled through the at least one tip shelf hole joins and mixes with the stream of hot combustion gases.

10. The method according to claim 9 and further comprising:
    c) channeling cooling air from the internal cooling circuit through a plurality of tip shelf holes extending through the tip shelf; and
    d) channeling cooling air from the internal cooling circuit through a plurality of tip wall openings extending through the recessed tip wall portion.

11. The method according to claim 10 wherein in (c), channeling cooling air through the plurality of tip shelf holes includes channeling cooling air through tip shelf holes each having a centerline oriented at an acute angle relative to a generally radially extending line.

12. The method according to claim 9 and further comprising:
    c) creating a convection cooling eddy effect in the stream of hot combustion gases wherein at least a portion of the gas stream is re-circulated in the tip region after cooling air from the at least one tip shelf hole and the at least one tip wall hole joins and mixes with the stream of hot combustion gasses.

13. A system comprising:
an internal cooling circuit of an airfoil;
at least one tip shelf hole extending through a tip shelf in flow communication with the internal cooling circuit, wherein the tip shelf is formed between a recessed portion of a tip wall extending outwardly from a tip cap and an outer wall of the airfoil; and
at least one tip wall opening extending through the recessed tip wall portion in flow communication with the internal cooling circuit.

14. The system according to claim 13 and further comprising a plurality of tip shelf holes extending through the tip shelf in flow communication with the internal cooling circuit.

15. The system according to claim 14 and further comprising a plurality of tip wall openings extending through the recessed tip wall portion in flow communication with the internal cooling circuit.

16. The system according to claim 15 wherein the tip wall openings are disposed in staggered relationship relative to the tip shelf holes.

* * * * *

UNITED STATES PATENT AND TRADEMARK OFFICE
CERTIFICATE OF CORRECTION

| | |
|---|---|
| PATENT NO. | : 7,857,587 B2 |
| APPLICATION NO. | : 11/606731 |
| DATED | : December 28, 2010 |
| INVENTOR(S) | : Victor Hugo Silva Correia et al. |

Page 1 of 1

It is certified that error appears in the above-identified patent and that said Letters Patent is hereby corrected as shown below:

In the Specification

In Column 1, line 3, after the Title of the Invention, insert a separate paragraph:

--The U.S. Government may have certain rights in this invention pursuant to contract number N00019-03-C-0361 awarded by the U.S. Department of the Navy.--

Signed and Sealed this
Twenty-sixth Day of November, 2013

Margaret A. Focarino
*Commissioner for Patents of the United States Patent and Trademark Office*

UNITED STATES PATENT AND TRADEMARK OFFICE
CERTIFICATE OF CORRECTION

| | | Page 1 of 1 |
|---|---|---|
| PATENT NO. | : 7,857,587 B2 | |
| APPLICATION NO. | : 11/606731 | |
| DATED | : December 28, 2010 | |
| INVENTOR(S) | : Victor Hugo Correia et al. | |

It is certified that error appears in the above-identified patent and that said Letters Patent is hereby corrected as shown below:

In The Specification

In Column 1, Line 4, before BACKGROUND OF THE INVENTION should read

STATEMENT REGARDING FEDERALLY SPONSORED RESEARCH & DEVELOPMENT

The US Government may have certain rights in this invention pursuant to
Contract No. N00019-03-C-0361 awarded by the US Department of the Navy.

Signed and Sealed this
Twelfth Day of July, 2016

Michelle K. Lee
*Director of the United States Patent and Trademark Office*